April 21, 1936.　　　　C. J. CLARKE　　　　2,038,344
FISHLINE REEL HOLDER
Filed Oct. 22, 1935
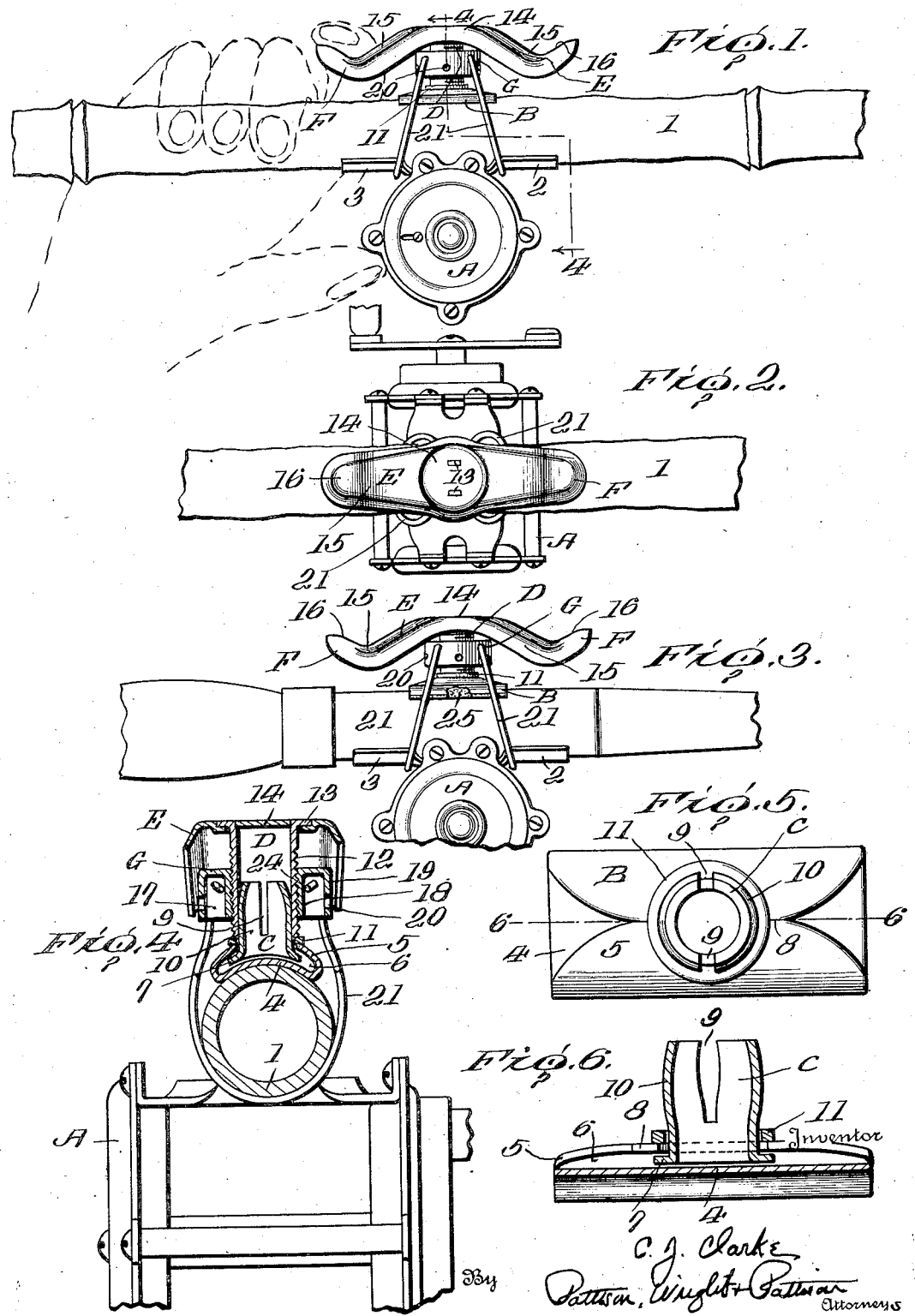

Patented Apr. 21, 1936

2,038,344

UNITED STATES PATENT OFFICE 2,038,344

FISHLINE REEL HOLDER

Charles Jackson Clarke, Kingsburg, Calif.

Application October 22, 1935, Serial No. 46,221

13 Claims. (Cl. 43—22)

This invention relates to improvements in fish line reel holders and has as a primary object the provision of a holder or clamp by means of which the ordinary and well known commonly used types of fishing reel may be readily, quickly and firmly clamped to a fishing rod either of the steel rod or bamboo rod type.

Another object is to provide an improved holder or clamp which is so constructed as to work equally well on fishing rods of different diameters.

Another and still further object of the invention is to provide a real holder or clamp which can be applied to any type of rod without the necessity of slipping or moving the clamp over the rod handle or moving the rod downwardly over its guide end, which manners of application of a reel clamp are objectionable.

Another and still further object of the invention is the provision of an improved reel holder or clamp which is provided with a hand or finger hold which is always positioned in the same plane with respect to the fishing rod and constitutes a means for improving the manipulation of the rod during the casting or reel winding operation.

A still further object of the invention is to provide an improved reel holder or clamp which is cheap and simple of construction yet highly effective and efficient in operation.

In the accompanying drawing:

Figure 1 is a view in side elevation showing the application of the invention in securing a reel to a fishing rod of the bamboo type.

Fig. 2 is a top plan view of Fig. 1.

Fig. 3 is a view in side elevation similar to Fig. 1 of the drawing but showing the invention used in connection with a steel rod.

Fig. 4 is an enlarged vertical sectional view taken on the line 4—4 of Fig. 1 looking in the direction indicated by arrows.

Fig. 5 is a top plan view of the holder base and the stub shaft carried thereby.

Fig. 6 is a longitudinal vertical sectional view taken on the line 6—6 of Fig. 5.

The present improved fishing reel holder or clamp constitutes an improvement upon an invention of somewhat similar nature appearing in my Patent No. 1,995,242, dated March 19, 1935, but has advantages thereover, as will more clearly appear from the following description when read in the light of the accompanying drawing.

Having reference now to all figures of the drawing with the exception of Fig. 3, I indicates a bamboo fishing rod and A the reel which it is desired to secure thereto. As is common with respect to all reels, the present reel is provided with a base comprised of arms 2 and 3 which in cross section are curved to fit the contour of the fishing rod at one side thereof.

The clamp or holder is provided with a base designated generally at B and which, it will be seen upon reference to Figs. 4, 5 and 6 of the drawing, comprises a bottom 4 and a top 5 arranged in spaced relationship to provide a chamber 6. The bottom 4 of the base is of an arc shape in cross section so as to readily fit the contour of the fishing rod and in practice this base is applied to the fishing rod at a point opposite to the point at which the reel base is applied to the rod, as clearly appears in Fig. 1 of the drawing.

A stub shaft is designated generally at C and is of hollow tubular form provided at one end with a collar which forms a head 7 which is positioned within the chamber 6 of the base. This stub shaft extends outwardly through an opening 8 provided within the base top and is disposed at right angles to the base. The opening 8 is of a size to quite loosely fit the stub shaft, with the result that there is really a universal connection between the stub shaft and the base which will permit not only transverse and longitudinal movement of the base with respect to the shaft, but due to the depth of the base chamber 6 a rocking movement of the base with respect to the shaft is also permitted. This stub shaft is provided with oppositely disposed cut-out portions forming slots 9 and intermediate its ends the shaft is slightly bulged as at 10. Preferably but not necessarily, a washer 11 loosely surrounds the stub shaft immediately above the base top 5.

A hollow shaft D externally threaded as at 12 has an open lower end while its upper end is suitably secured as at 13 and carries a hand hold E. This hand hold is of an elongated comparatively narrow form having a centrally arranged approximately flat portion 14 which at its opposite sides curves downwardly as at 15 and then upwardly as at 16 to form finger grips F at its opposite ends. The manner of utilizing the finger grip while casting with the rod is clearly illustrated in Figure 1 of the drawing.

The threaded rod D together with its hand hold are mounted upon the stub shaft C in the manner illustrated in Fig. 4 of the drawing. The stub shaft C is of slightly greater size than the interior opening of the threaded shaft, which fact together with its bulged portion 10 and its longitudinal slots 9 cause the stub shaft to tightly clamp the interior of the threaded shaft under resilient tension when these shafts are telescopically arranged, as illustrated in Fig. 4 of the drawing.

The result of the construction thus far described is that as the threaded shaft is rotated by the hand hold the stub shaft will rotate with the threaded shaft, the stub shaft in turn rotating within the opening 8 of the base.

A nut G is threadedly mounted upon the threaded shaft and is of a U-shape in cross section to provide a space 17 between its inner wall 18 and its outer wall 19. The outer wall of this nut is provided with a series of openings 20 arranged in different horizontal planes.

Loops 21 are adapted to encircle the rod and the reel base arms 2 and 3 and have their ends bent at right angles as at 24 for detachable connection with the holes 20 of the nut.

It will be at once evident from Fig. 1 of the drawing that the clamp need not be slid onto the fishing rod from either of its ends due to the removability of the loops 21. It should be further evident that rods of different sizes or diameters can be taken care of by reason of the holes 20 in the nut being arranged in different horizontal planes.

Specific description of Fig. 3 need not be given as the device here illustrated is identical with that previously described, with the exception that the outer face of the bottom 4 of the holder base is provided with a piece of rubber 25 or the like to prevent any possibility of slippage between the rod and the holder base.

With the parts arranged as illustrated in Figs. 1 and 3 of the drawing, it will be evident that by rotating the hand hold E the threaded shaft D is rotated and that the nut G is held against rotation by the loops 21 with the result that the nut G will travel up the threaded shaft and cause the loops 21 to tightly clamp the reel base upon the rod. By the provision of finger holds or grips F at both ends of the hand hold it is not necessary to turn the hand hold a complete turn to bring one of the finger grips in proper aligned relationship with the rod. Additionally the finger grips and hand hold will at all times, irrespective of the size or dimension of the rod and irrespective of the number of rotations given to the hand hold, lie in the same horizontal plane with respect to the rod. That is to say, the hand hold and the finger grips will always be separated the same distance from the rod and will therefore always be properly positioned to provide the best possible finger grip for the manipulation of the rod. This feature and attribute is not true with respect to my heretofore mentioned patented reel holder.

Although I have shown my holder as applied to a fishing rod and illustrated specifically for clamping a reel on a rod, it is to be understood that my holder could be used for clamping any article to a rod without departing from the spirit of the invention or without departing from the scope of the appended claims.

I claim:

1. A fishing rod reel holder, comprising a base adapted to be applied to one side of a rod, an externally threaded shaft being provided with a finger hold and rotatable upon said base, a nut carried by said shaft, said nut being provided with loops adapted to encircle said rod, and said loops clamping the fishing rod between themselves and said base when the threaded shaft is rotated to move the nut along the shaft away from the base.

2. A fishing rod reel holder, comprising a base provided with an extension arranged at right angles to said base, a hollow externally threaded shaft telescopically receiving said base extension, a finger hold carried by said shaft, a nut rotatable on said shaft and provided with loops encircling said base and adapted to encircle a rod and the base of the rod reel for clamping the reel in place upon the rod.

3. An improved fishing rod reel holder, comprising a base adapted to be applied to a rod, said base being provided with a hollow split extension extending at right angles to said base, a hollow externally threaded screw adapted to telescopically receive under resilient tension said base extension, said base being freely rotatable with respect to said base extension member, said screw being provided with finger holds one function of which is to provide means to rotate said shaft, and a nut carried on said shaft and provided with loops adapted to encircle the fishing rod for clamping a reel thereon.

4. A fishing rod reel holder, comprising a base of an arc shape in cross section and adapted to be applied to one side of a rod, a hollow extension member carried by said base and loosely mounted therein to permit free rotation of said member in the base and to permit a rocking movement between the base and the member, said member extending at right angles to said base, a hollow externally threaded shaft adapted to telescopically receive said base extension member, a finger hold carried by said shaft, a nut threadedly carried by the shaft, and said nut being provided with loops adapted to encircle the fishing rod for clamping a reel thereon.

5. A fishing rod reel holder, comprising a base having a bottom and a top in separated relationship, said base bottom being approximately arc shaped in cross section and adapted to be applied to a fishing rod, a stub shaft provided at one end with a head, the head of said stub shaft being positioned between the bottom and top of said base and said shaft passing loosely through the base top and at right angles thereto, an externally threaded hollow shaft adapted to telescopically receive the outwardly extending end of said stub shaft, a finger hold carried by said threaded shaft, and a nut threadedly mounted on said threaded shaft and provided with loops to encircle the fishing rod for clamping a reel thereon.

6. A fishing rod reel holder, comprising a base adapted to be applied to one side of a fishing rod, a threaded shaft freely rotatable on said base, a nut threaded on said shaft and movable longitudinally along the same, and means having attachment with the nut and adapted to encircle said rod for clamping a reel upon the rod.

7. A construction such as defined in claim 2, wherein the base extension is retained in and rotatable with the threaded shaft through resilient tension.

8. A construction such as defined in claim 6, wherein the means encircling the fishing rod has adjustable connection with the nut, for the purpose described.

9. A fishing rod reel holder, comprising a base having a top and a bottom in spaced relationship, a stub shaft having an enlarged end freely rotatable in the space between the base top and bottom and having an extending portion extending outwardly at right angles to said base, an externally threaded shaft adapted to telescopically receive the outwardly extending end of said stub shaft, means for rotating said threaded shaft, a nut threadedly mounted on said threaded shaft and adapted to move longitudinally therealong, and means encircling a fishing rod and having connection with said nut for clamping the reel on said rod.

10. A fishing rod reel holder, comprising a base adapted to be applied to one side of a rod, means encircling the rod for clamping a reel thereon, and means connected to and movable with respect to the base for tightening said encircling means upon the fishing rod, the connection between said tightening means and said base permitting a rocking movement of the base, for the purpose described.

11. A construction such as defined in claim 3, wherein the loops are quickly detachable from and have adjustable connection with the nut.

12. A construction such as defined in claim 1, wherein a hand hold provided with finger grips at its opposite ends is provided for rotating the threaded shaft.

13. A fishing rod reel holder, comprising a base adapted to be applied to one side of a fishing rod, a rotatable threaded member carried by said base, a second threaded member adapted for movement along the first-mentioned threaded member, and means having attachment with the second member and adapted to encircle said rod for clamping a reel thereupon.

CHARLES JACKSON CLARKE.